(12) United States Patent
Luea

(10) Patent No.: US 9,659,509 B2
(45) Date of Patent: May 23, 2017

(54) MULTI-PURPOSE LABELING DEVICE

(75) Inventor: Jon Luea, Lansing, MI (US)

(73) Assignee: MULTI PACKAGING SOLUTIONS, INC., Lansing, MI (US)

( * ) Notice: Subject to any disclaimer, the term of this patent is extended or adjusted under 35 U.S.C. 154(b) by 429 days.

(21) Appl. No.: 13/351,760

(22) Filed: Jan. 17, 2012

(65) Prior Publication Data

US 2013/0180138 A1    Jul. 18, 2013

(51) Int. Cl.
*G09F 3/04* (2006.01)
*G09F 3/20* (2006.01)

(52) U.S. Cl.
CPC .............. *G09F 3/206* (2013.01); *G09F 3/04* (2013.01); *Y10T 29/49826* (2015.01); *Y10T 428/15* (2015.01)

(58) Field of Classification Search
CPC ........................................................ G09F 3/04
USPC ............... 40/330, 634, 665; 428/43
See application file for complete search history.

(56) References Cited

U.S. PATENT DOCUMENTS

| | | | | |
|---|---|---|---|---|
| 1,371,305 A | * | 3/1921 | Hanney | G09F 3/00 40/668 |
| 2,938,291 A | * | 5/1960 | Tavan | G09F 13/16 40/613 |
| 3,757,936 A | * | 9/1973 | Lindegren | 206/527 |
| 3,775,882 A | | 12/1973 | Wheeler | |
| 4,008,835 A | * | 2/1977 | Budzik | 223/85 |
| 4,266,354 A | * | 5/1981 | Daenen | 40/665 |
| 4,379,372 A | | 4/1983 | Alexander et al. | |
| 4,862,617 A | | 9/1989 | Cooke et al. | |
| 5,167,086 A | | 12/1992 | Fast | |
| 6,276,029 B1 | * | 8/2001 | Buettell | 24/30.5 P |
| 6,354,027 B1 | * | 3/2002 | Cummings | 40/359 |
| 7,004,441 B1 | | 2/2006 | Rutland | |
| 7,249,432 B2 | * | 7/2007 | Lewis | 40/673 |
| 2008/0120881 A1 | * | 5/2008 | Rhinehart et al. | 40/665 |

FOREIGN PATENT DOCUMENTS

WO    2009/073892 A1    6/2009

OTHER PUBLICATIONS

European Extended Search Report dated Jul. 21, 2014; Application No. 13151215.4.

* cited by examiner

*Primary Examiner* — Charles A Fox
*Assistant Examiner* — Christopher e Veraa
(74) *Attorney, Agent, or Firm* — The Dobrusin Law Firm, P.C.

(57) ABSTRACT

A labeling device that can be affixed to articles of different shapes by more than one method and can provide information regarding the contents of the article.

20 Claims, 6 Drawing Sheets

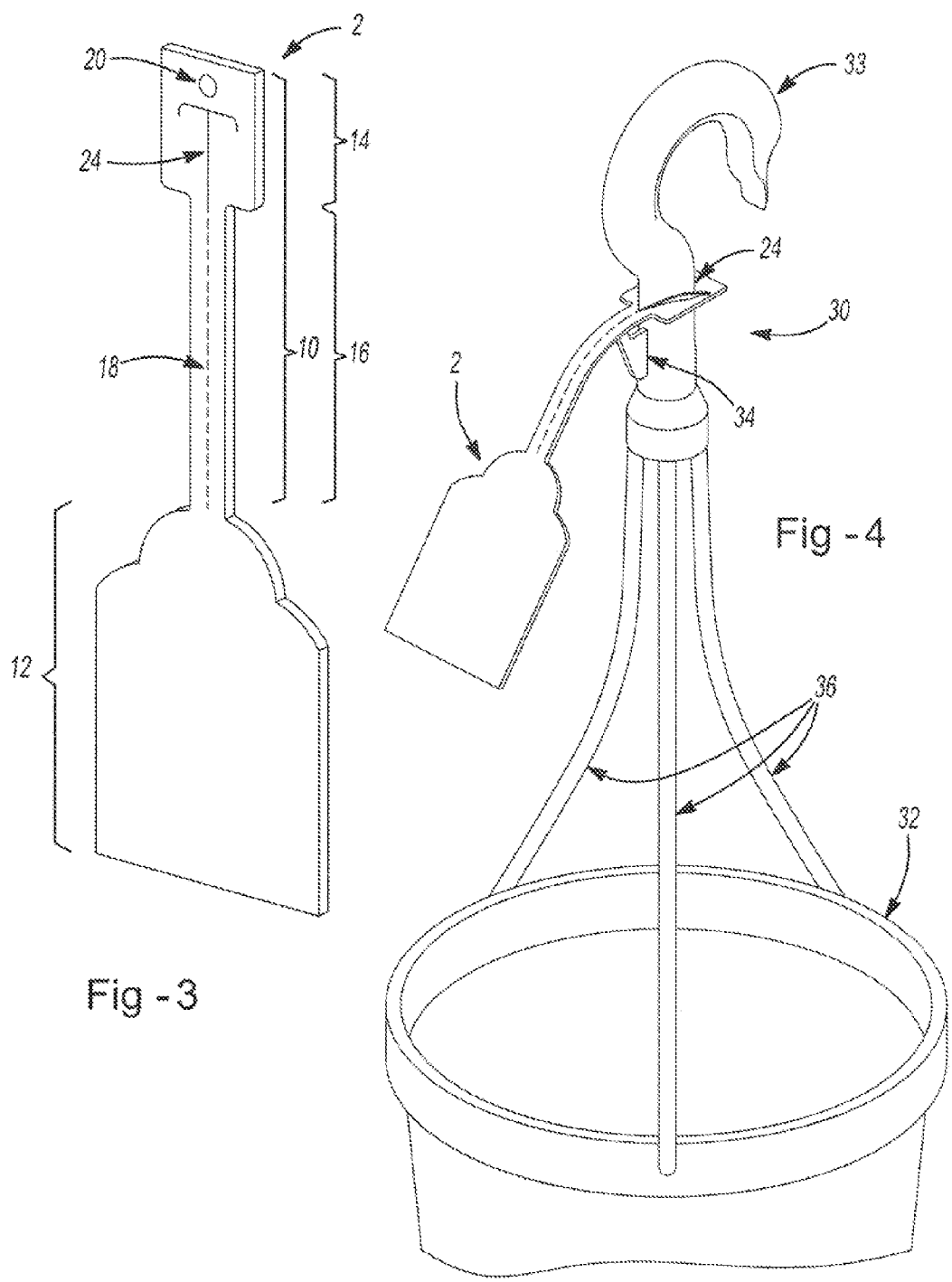

MULTI-PURPOSE LABELING DEVICE

FIELD OF THE INVENTION

The present teachings generally relate to an article labeling device and more specifically to a labeling device for plant containers.

BACKGROUND OF THE INVENTION

Typically, labeling devices used for labeling plant containers and/or the contents of the container are connected to the container structure, its accessories or its contents in one particular way. Some labeling devices may be wrapped around an object such as a branch or part of a plant, see for example, U.S. Pat. No. 3,775,882 and U.S. Pat. No. 4,379,372. Some labeling devices have a slot or an opening to accommodate an object of a certain diameter, see for example, U.S. Pat. No. 7,004,441 and U.S. Pat. No. 4,862,617. Some are adapted to accommodate objects having varying diameters, see for example, U.S. Pat. No. 5,167,086. As a result, each type of plant, plant container, or container accessory, requires a different labeling device having configuration suitable for each specific structure. Accordingly, in view of the above, there exists a need for labeling devices which overcome some or all of the above drawbacks in the art. For example, what is needed is a labeling device with a versatile structure that allows for more than one method of connection (e.g. labeling) to a container structure, a container accessory, a plant and/or a plant care accessory.

SUMMARY OF THE INVENTION

The present invention meets one or more of the above needs by providing a labeling device that allows more than one method for labeling a plant using the same labeling device to be affixed to a container structure, container accessories and plant care accessories.

One possible embodiment of the present teachings includes a labeling device comprising a body having a display portion and a header portion located adjacent the display portion, the header portion including an upper region having an aperture and T-shaped slit. The labeling device may further include a lower region adjacent both the upper region and the display portion, having a perforated channel extending longitudinally between the upper portion and the display portion.

The present teachings include a labeling device comprising a body having a display portion and a header portion located adjacent the display portion. The header portion including an upper region having an aperture and T-shaped slit, wherein the aperture is spaced apart from and located in an opposing relationship with the T-shaped slit. The labeling device may further include a lower region adjacent both the upper region and the display portion, having a perforated channel extending longitudinally between an edge of the T-shaped slit and a perimeter of the display portion.

The present teachings may further include a method of labeling comprising providing the labeling device described therein, separating a side of the perforated channel from an opposing side of the perforated channel to form an elongated opening and curving the labeling device about an article. The upper portion is then located through the elongated opening formed in the perforated channel, thereby forming a loop about the article. The teachings herein may also provide for a method of labeling comprising providing the labeling described therein, followed by locating the labeling device onto an elongated member so that at least a portion of the elongated member extends into and through the aperture. The method of labeling may also comprise providing the labeling device described therein, following by locating the labeling device onto an elongated member so that at least a portion of the elongated member extends into and through the T-shaped slit. Hence with respect to prior art, the present teachings herein allow utilization of the same one-piece integrally formed labeling device having multi-purpose structure which allows for different methods of labeling. It is therefore an object of the teachings herein to provide a means of increased versatility and cost-effectiveness in labeling containers, in particular plant containers.

DESCRIPTION OF THE DRAWINGS

FIG. 3 illustrates an exemplary labeling device in accordance with the present teachings.

FIG. 4 illustrates an additional exemplary method of affixing the labeling device to an accessory of an article.

DETAILED DESCRIPTION

Figure 1:
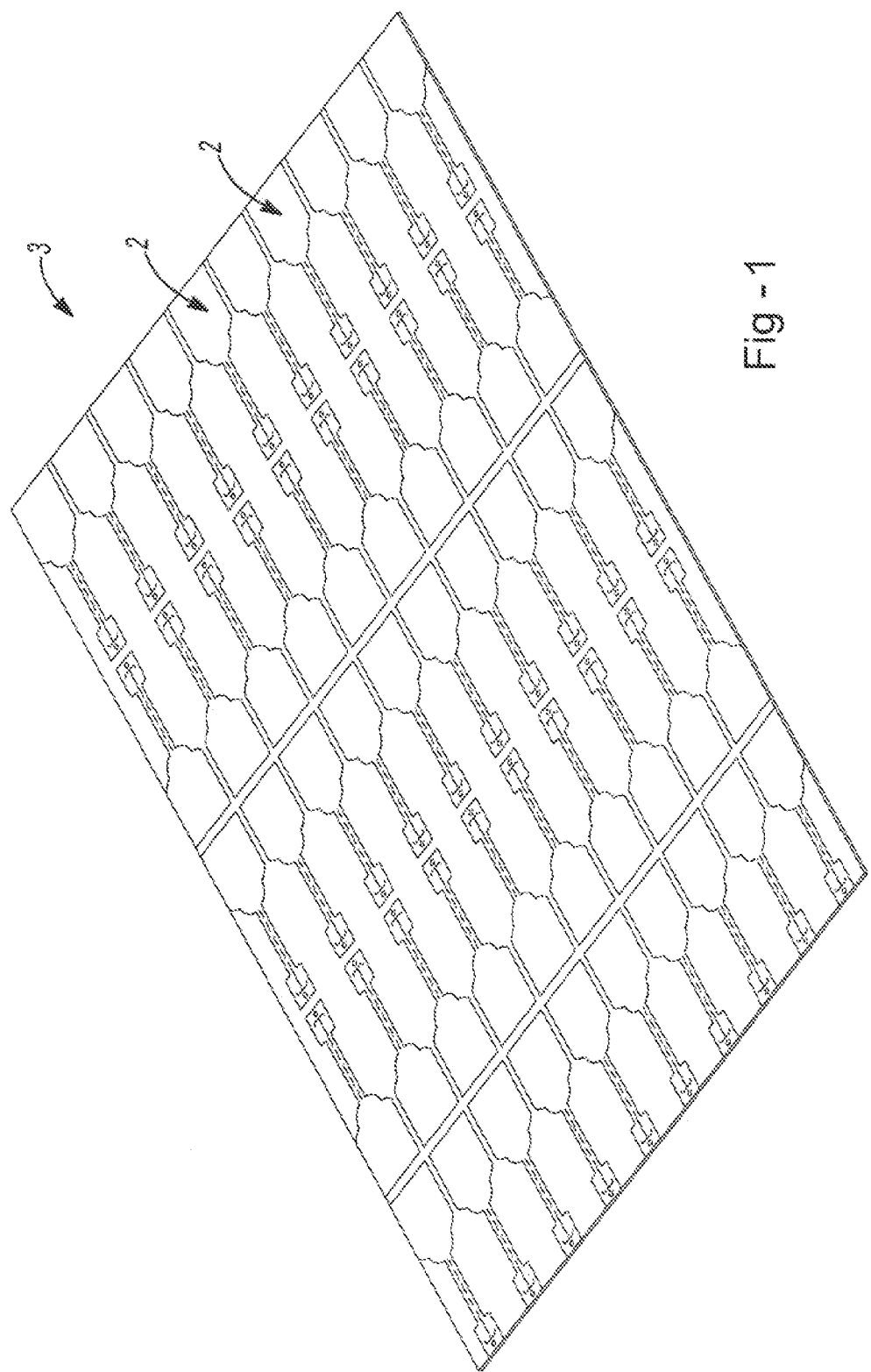
FIG. 1 illustrates an example of a partial layout of a plurality of attached labeling devices.

The following description of the preferred embodiment(s) is merely exemplary in nature and is in no way intended to limit the teachings, its application, or uses.

The present teachings are predicated upon providing a labeling device that is attached to an article that includes contents therein, wherein the labeling device is preferably attached to the container structure, or an accessory of the container, or a plant care accessory, or the plant care device. The labeling device may describe the contents of a container, and may be attached to a hanger of the container that contains a plant and may describe the plant located within the container, its uses, care instructions, recipes, or a combination thereof. The labeling device has a body that includes a display portion, the display portion being used for the description of the article and/or its contents. The body of the labeling device also includes a header portion attached to the display portion. The header portion may include an upper region and a lower region. The upper region may include at least one aperture and at least one T-shaped slit. The aperture and the T-shaped slit assist in methods of affixing the labeling device to various articles. The lower region may include one or more perforated channels that extend between the upper portion and the display portion. The perforated channel assists in providing one or more methods for labeling.

The labeling device may be any device that may be used to label an article. The labeling device may be made of multiple pieces. Preferably, the labeling device may be made of one unitary piece. The labeling device may be die-cut or stamped from one unitary piece. The labeling device may be of any shape and size so that the device can be affixed to an article to provide labeling. The size and shape of the labeling device may vary based upon the size of the article which the labeling device is labeling. The size and shape of the various components of the labeling device may be modified independently of other components of the labeling device. The size and shape of the at least one aperture, the T-shaped slit and the perforated channel may vary based upon the size and the configuration of the article which the labeling device is labeling. The labeling device is removable and may be reusable.

The labeling device may include a length. The length of the labeling device may be any length so that the labeling device may be used to label an article. The length of the labeling device may include the lengths of both the display portion and the header portion. The length of the labeling device may be measured from the lowest point of the display portion to the highest point of the header portion. For example, the labeling device may be about 18.5 cm (7.3 inches) long and about 6.0 cm (2.4 inches) wide. The longest length of the entire labeling device may be about 40 cm or less, about 30 cm or less, or about 20 cm or less. The labeling device may have multiple lengths. For example, the display portion may have one length and the header portion may have another length. The upper region may have one length and the lower region may have another length. Preferably, the upper region may have the shortest length. The length of the lower region may be about 8.0 cm (3.1 in) or less, about 7.0 cm (2.8 in) or less, about 6.0 cm (2.4 in) or less. The length of the labeling device may vary by about ±10 percent, about ±20 percent, or about ±50 percent of the dimensions discussed herein. The length of the labeling device may be based upon the size of the article to which the labeling device is to be attached.

The labeling device may include a width. The width of the labeling device may be any width so that the labeling device may be used to label an article. The display portion and the header portion may have the same width. The labeling device may have multiple widths. For example, the display portion may have one width and the header portion may have another width. The display portion may have the largest width of the labeling device. The upper region may have one width and the lower region may have another width. The width of the upper region may be about 3.0 cm (1.2 in) or less, 2.5 cm (1.0 in) or less, 2.0 cm (0.8 in) or less. Preferably, the lower region of the header portion may have the smallest width of the labeling device. The width of the labeling device in the largest dimension may be about 7.0 cm (2.8 in) or less, about 6.0 cm (2.4 in) or less, or about 5.0 cm (2.0 in) or less. The width of the labeling device may vary by about ±10 percent, about ±20 percent, or about ±50 percent of the dimensions discussed herein. Preferably, the display portion and the header portion may each comprise a portion of the length, the width or both of the labeling device.

The display portion may be any size and shape. The display portion may be any size and shape so that the labeling device may be used to label an article. The display portion may be any shape and size so that the display portion assists in holding the labeling device on an article. The display portion may be any size and shape so that advertising, product information, care instruction, pricing, pictures, stickers, recipes, any other printed media, or a combination thereof may be attached to, placed on, or printed on the labeling device. Preferably, the display portion is attached to the lower region of the header portion.

The body of the labeling device may also include a header portion. The header portion may be any size and shape so that the labeling device may be used to label. The header portion may be any size or shape so that the header assists in maintaining the location of the labeling device on an article. The header portion may be any size and shape so that advertising, product information, care instruction, pricing, pictures, stickers, recipes, any other printed media, or a combination thereof may be attached to, placed on, or printed on the labeling device. The header portion may include one or more regions. Preferably, the header portion includes an upper region and a lower region.

The lower region of the header may be any size or shape discussed herein. The lower region may assist in maintaining the labeling device on an article in more than one configuration. The lower region of the header may be connected to an article in more than way. The lower region includes a perforated channel extending longitudinally between the upper region of the header and the display portion. The perforated channel may be any size discussed herein. The perforated channel may be located anywhere in between the upper region and the display portion. The perforated channel may also extend into the upper region and/or the display portion. Preferably, it can extend between the border of the upper region between the lower region to the border between the display portion and the lower region. Preferably, the perforated channel is extended through a center portion of the lower portion. The perforated channel may be formed by perforations, holes, slits, cuts, scores, creases, or any combination thereof so that the two sides of the perforated channel may be detached from each other to form an opening. One of the ways that the perforated channel may assist in maintaining the labeling device on an article is by first by separating a first side of the perforated channel may be separated from an opposing side and thereby forming an elongated opening. An article may be then located through the elongated opening. As a further example, a first side of the perforated channel from an opposing side and making an elongated opening. Then, the labeling device may be curved around an article, so that the header portion or the display portion may be inserted through the elongated opening, thereby forming a loop. The perforated channel may allow for forming an opening by pulling, cutting, ripping, tearing, slicing, the like, or any combination thereof.

The upper region may be any size or shape discussed herein. The upper region may assist in holding the labeling device on an article. The upper region may be connected to an article by more than one means. The upper region may include one or more apertures. The upper region may include only one aperture. The one or more apertures may be round, oval, square, rectangular, diamond, star, or any other shape that assists in attaching the labeling device. The one or more apertures may be substantially circularly shaped. The one or more apertures may be a through-hole, a slit, or a cut. The one or more apertures also may be formed by detachment features, located about the aperture perimeter, such as perforations, scores, creases, holes, slits, or cuts or any combination thereof. The detachment features may be formed so that a center piece of one or more of the apertures may be removed. The detachment features may allow a removable portion to be removed by cutting, piercing, ripping, tearing, pulling, slicing, the like, or any combination thereof. The one or more apertures may have any size discussed herein. The diameter of the one or more apertures may be about 0.6 cm (0.25 in) or less, 0.4 cm (0.2 in) or less, 0.2 cm (0.08 in) or less. The diameter of the one or more apertures may vary by about ±10 percent, about ±20 percent, or about ±50 percent of the dimensions discussed herein. One of the ways that the one or more apertures may assist in maintaining the labeling device on an article is by locating an article or at least a portion of an article through the one or more of the apertures. At least the portion of the article may be elongated.

The upper region may include a T-shaped slit. The T-shaped slit is located in an opposing relationship with the one or more apertures. The T-shaped slit may be spaced apart from the one or more apertures. The T-shaped slit may be spaced apart from a perforated channel. Preferably, the T-shaped slit may be in communication with the perforated channel. The T-shaped slit may be T-shaped, V-shaped, Y-shaped, U-shaped, X-shaped, C-shaped, S-shaped, H-shaped, J-shaped, triangular, rectangular, round, oval, diamond, star, or any other shape that assists in affixing the labeling device. Preferably, the T-shaped slit is substantially T-shaped. The T-shaped slit may be formed of slits, cuts, perforations, holes, scores, creases, or a combination thereof so that the sides of the T-shaped slit may be detached from one another to form an opening. Preferably, the T-shaped slit is a slit or a cut. The T-shaped slit may be any size discussed herein. The T-shaped slit may have any size discussed herein. The length of any part of the T-shaped slit may be about 2.5 cm (1.0 in) or less, 1.0 cm (0.4 in) or less, 0.5 cm (0.2 in) or less. The length of the of any part of the T-shaped slit may vary by about ±10 percent, about ±20 percent, or about ±50 percent of the dimensions discussed herein. One of the ways that the T-shaped slit may assist in maintaining the labeling device on an article, is by locating an article or at least a portion of an article through the T-shaped slit. At least the portion of the article is elongated.

The labeling device may be any device that may be used to label an article. The labeling device may be made of multiple pieces. Preferably, the labeling device may be made of one unitary integrally formed piece. The labeling device may be die cut or stamped from one unitary piece. The labeling device may be of any shape and size so that the device self-attaches to an article and provides labeling. The size and shape of the labeling device may vary based upon the size of the article to which the labeling device is attached.

The article may be any item that holds contents. The article may retain water. The article may be bio-degradable. The article may be made of any material that holds contents and assists a user in carrying the contents. The article may be made of plastic, metal, paper, cardboard, recycled material, virgin material, or a combination thereof. Preferably, the article is a container. More preferably, the container includes container accessories. The container may also include plant care accessories. The plant care accessories may be also plant care devices. The accessories may be any item that assists a user in carrying, supporting, hanging, mantle, decorating, growing and caring for plants, the like, or a combination thereof. The accessory can be removable. The container structure may include a container mount, container brackets, container hanger, container support structure, the like, or a combination thereof. The container and plant care accessories may include, for example, container decorations, container ornaments, container pulley, container pole, container stand, sensing devices, watering devices, the like, or a combination thereof. The container and its accessories may be any shape, size, configuration or material. The accessories may be also a device. The accessories may be made of plastic, metal, paper, cardboard, recycled material, virgin material, or a combination thereof. The container may be any shape that holds contents. The container may be spherical, cubic, pyramidal, conical, cylindrical or any combination thereof. Preferably, the container and the accessories may be any configuration so that the labeling device may be attached to at least a portion of the container or the accessories. The container may be a pot, basket, planter, bucket, box the like, or any combination thereof.

The base substrate for forming the packaging of the container may be any material strong enough to withstand the weight of contained articles. A particular feature of the material may be that it is durable enough to hold liquids for an extended period of time without risk of leaking. The substrate may be formed of paper materials including but not limited to paperboard, chipboard, cardboard, fiberboard, natural fibers, mineral fibers or any combination thereof. The material may be a virgin material, a post-consumer recycled material, or both. The substrate material may be a recyclable material and/or a biodegradable material. If the substrate material includes paperboard, the paperboard may be a bleached or unbleached paperboard. For example it may be a solid bleached sulfate (SBS) paperboard. The material may contain a major portion that can be recycled. The base substrate material may be formed of a polymeric material including but not limited to thermoplastics, thermoset plastics, elastomeric containing materials or any combination thereof. Examples of polymeric materials that may be employed include polyamide, polyester, polystyrene, polyethylene (including polyethylene terephthlate, high density polyethylene and low density polyethylene), polypropylene, polyvinyl chloride, bio-based plastics/biopolymers (e.g., poly lactic acid), silicone, acrylonitrile butadiene styrene (ABS), or any combination thereof.

The contents may be any item that fits into the article. The article preferably includes more than one typed contents. At least one of the contents may be a malleable medium. At least one content may be a growing medium for example, a potting soil, dirt, gravel, sand, fertilizer, water solution, or a combination thereof. One of the contents may be a living medium. The living medium may be a plant. For example, the living medium may be a herb, flower, tree, cactus, moss, fungi, fruit-bearing plant, vegetable plant or a combination thereof. In one non-limiting example, the article may be a hanging pot that includes dirt with herbs and the labeling device is affixed to a portion of the hanger. In another non-limiting example, the labeling device is affixed to a portion of a plant. The contents may be removed from the article and placed and/or planted elsewhere.

The labeling device may be made of any material that allows the device to be used as a labeling device. The labeling device may be made of a flexible material. The labeling device may be made of a cuttable material. The labeling device may be made of a rippable material. The labeling device may be made of a material that may be slit, cut, perforated, scored, creased, or any combination thereof. The material may be made of any material that may be die-cut. The labeling device may be made of a recyclable material. The labeling device may be made of a biodegradable material. The labeling device may be made of paper, plastic, metal, cardboard, coated paperboard, or any combination thereof. The labeling device may be made of any material that may be embossed, varnished or laminated, or any combination thereof. The labeling device may be made of any material that may be coated, painted, printed, adhered to, or any combination thereof. The labeling device may include a portion that may receive written material so that notes may be written on the labeling device. The portion that may receive written material may include a coating so that that the writing may be easily removed and more writing may be applied. For example, the user may include notes about the last time the contents of the article were watered, fertilized, or both. The labeling device may include waterproofing. The labeling device may be washed and reused.

The device taught herein may be used in several processes of labeling. Each of the processes may include one or more steps described herein and the steps may be performed in the order described herein or an order different than described herein. For example, the processes may include customizing the labeling device with a message, photo, instructions, information, usage ideas, plant care instruction, product information, any other information discussed herein, or any combination thereof. The process may include printing on the labeling device. The process may include separating a first side of the perforated channel from an opposing side of the perforated channel to form an elongated opening and curving the labeling device about an article. The upper portion may be then located through the elongated opening formed in the perforated channel, thereby forming a loop about the article. The process may thus result in the labeling device being affixed to the article.

In another example, the process includes providing an article, a container, a plant, or a combination thereof to be labeled and customizing the labeling device with a message, photo, instructions, information, usage ideas, plant care instruction, product information, any other information discussed herein, or any combination thereof. The process further includes locating the labeling device onto an article so that at least a portion of the article extends into and through the aperture. In another example, the processes includes providing an article, a container, a plant, or a combination thereof to be labeled, customizing the labeling device with a message, photo, instructions, information, usage ideas, plant care instruction, product information, any other information discussed herein, or any combination thereof. The process further includes locating the labeling device onto an article so that at least a portion of the article extends into and through the T-shaped slit.

FIG. 1 illustrates a partial layout of an example of multiple labeling devices (2) as part of a die-cut sheet (3) plurality of labeling devices. FIG. 1 illustrates one of the possible embodiments of the configuration of the layout pattern.

Figure 2:
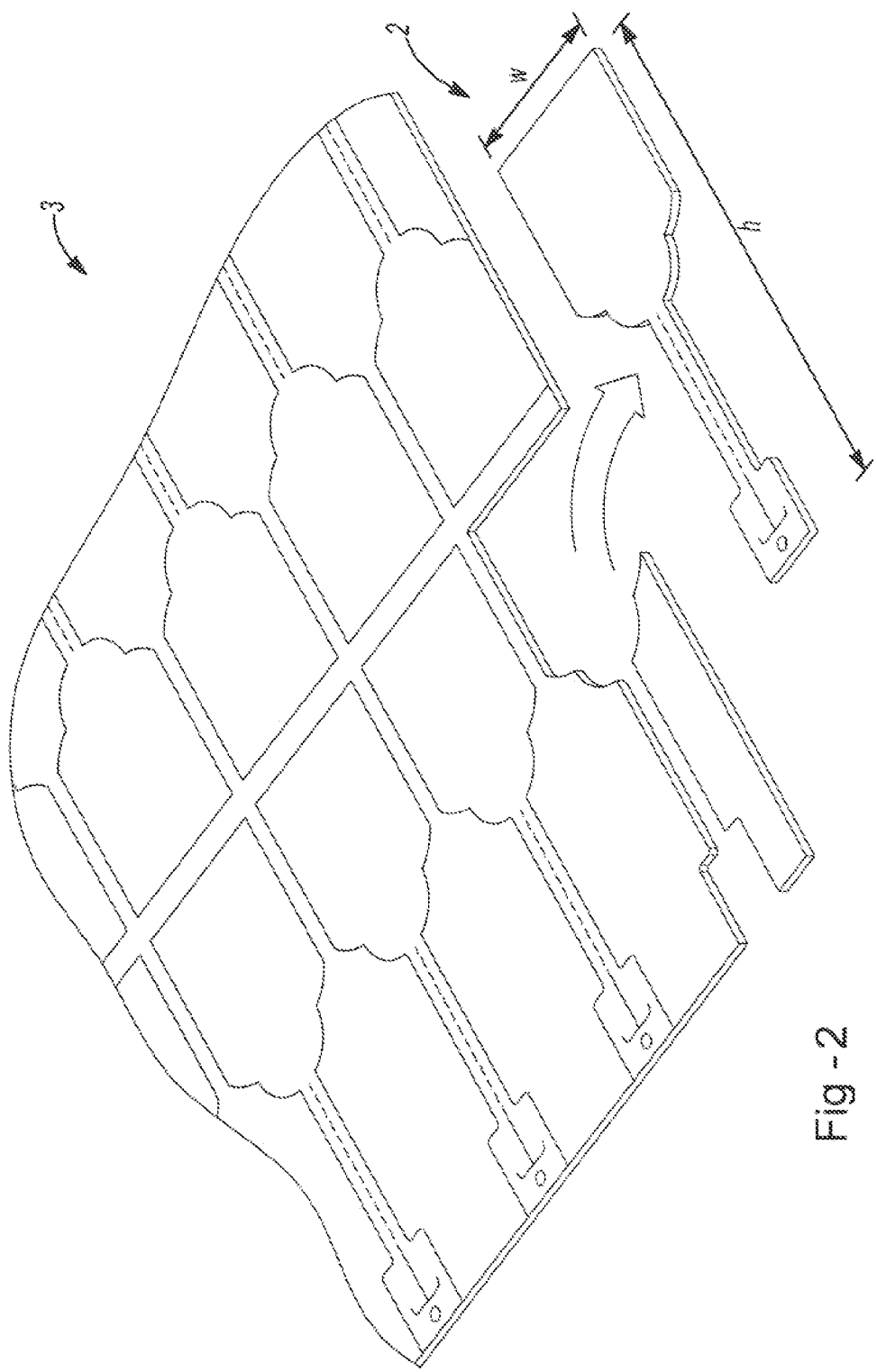
FIG. 2 illustrates a labeling device as it is detached from the plurality of attached labeling devices

FIG. 2 illustrates labeling device 2 as it is removed from the die-cut sheet 3 as demonstrated by the arrow. The labeling device 2 has a height (h) and a width (w).

FIG. 3 illustrates one example of the labeling device 2 taught herein. The labeling device 2 as shown includes a header portion 10, the header portion further includes an upper region 14 and a lower region 16. The labeling device 2 as shown includes a display portion 12. The lower region 16 further includes a perforated channel 18 extending between the display portion 12 and the upper region of the header portion 14. The upper region 14 further includes an aperture 20 and a T-shaped slit 24.

FIG. 4 illustrates the labeling device 2 as shown in FIG. 3 used in conjunction with an accessory 30 of an article 32. The accessory 30 as shown is a basket hanger and it further includes a hook 33, a pin hook 34 and three holders 36. The labeling device is affixed to accessory 30 by locating the hook 33 through the T-shaped slit 24.

Figure 5:
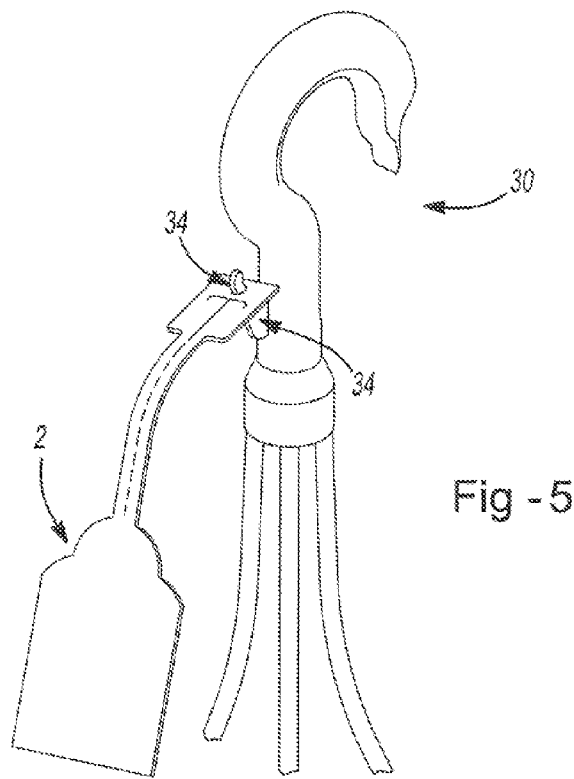
FIG. 5 illustrates an additional exemplary method of affixing the labeling device to an accessory of an article.

FIG. 5 illustrates the labeling device 2 as shown in FIG. 3 used in conjunction with an accessory 30 of an article 32. The accessory 30 as shown is a basket hanger. The labeling device is affixed to accessory 30 by locating the pin hook 34 through the aperture 20.

Figure 6:
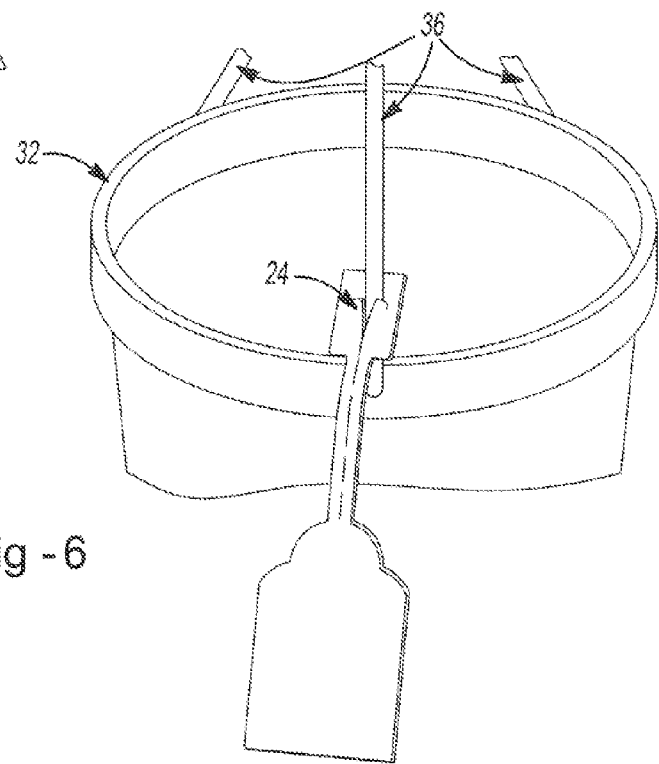
FIG. 6 illustrates an additional exemplary method of affixing the labeling device to an accessory of an article.

FIG. 6 illustrates the labeling device 2 as shown in FIG. 3 used in conjunction with an accessory 30 of an article 32. The accessory 30 as shown is a basket hanger and the labeling device is affixed to the accessory 30 by locating one of the holders 36 through the T-shaped slit 24.

Figure 7:
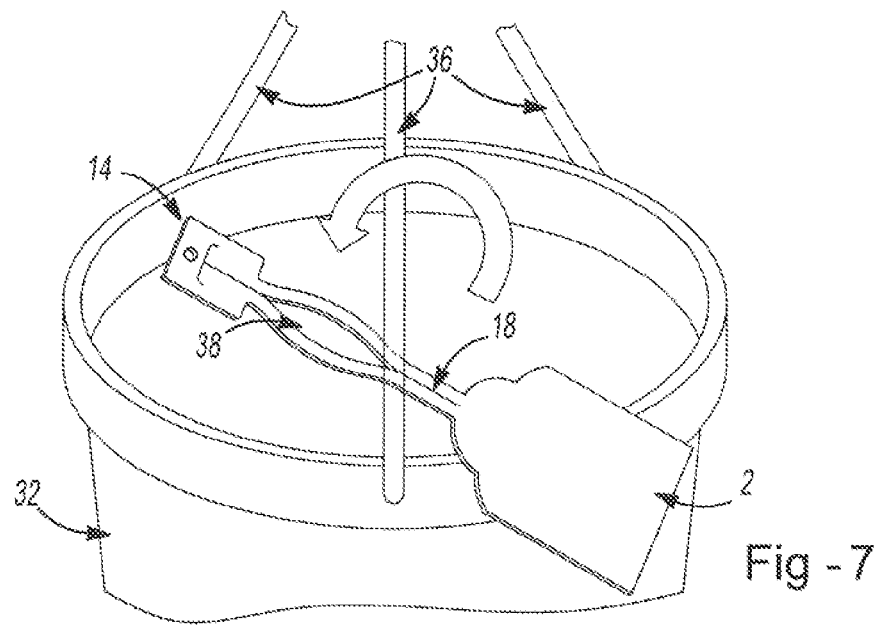
FIG. 7 illustrates an additional exemplary method of affixing the labeling device to an accessory of an article.

FIG. 7 illustrates the labeling device 2 used in conjunction with an accessory 30 of an article 32. The accessory 30 as shown is a basket hanger and the labeling device is affixed to the accessory 30 by curving the labeling device about the holder 36, locating the display portion of the labeling device 2 through the elongated opening 38 formed in the perforated channel 18.

Figure 8:
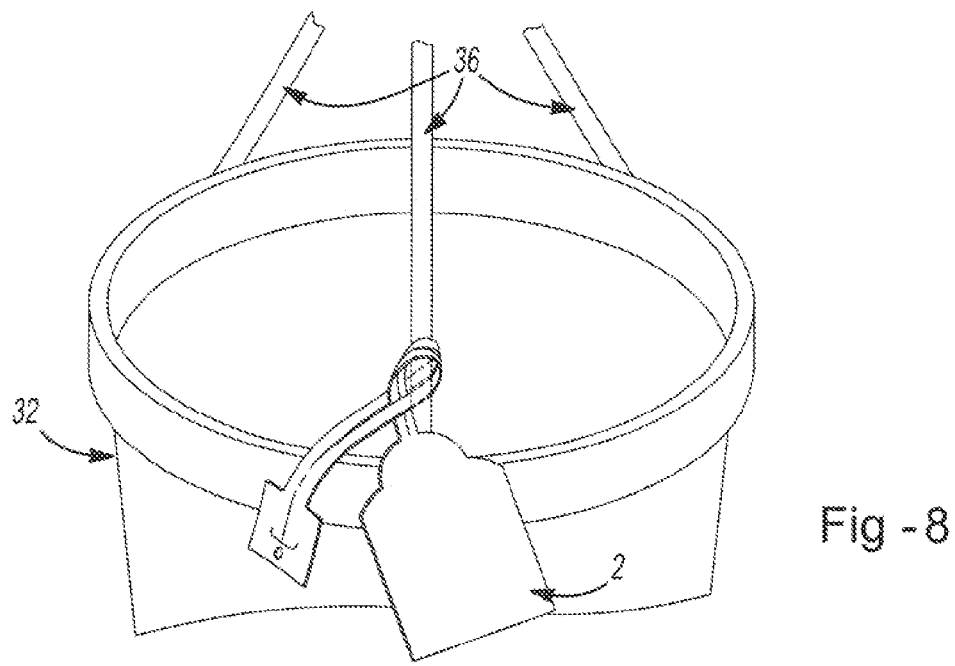
FIG. 8 illustrates an additional exemplary method of affixing the labeling device to an accessory of an article.

FIG. 8 illustrates the labeling device 2 used in conjunction with an accessory 30 of an article 32. The FIG. 8 illustrates the loop the labeling device 2 forms about the holder 36 as a result of a process depicted in FIG. 7.

Figure 9:
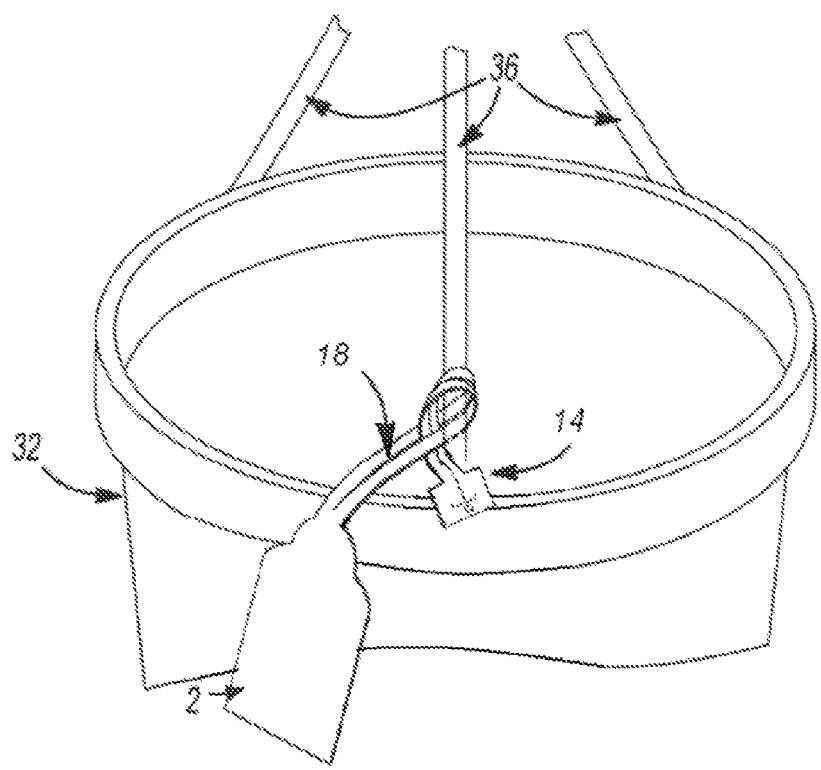
FIG. 9 illustrates an additional exemplary method of affixing the labeling device to an accessory of an article.

FIG. 9 illustrates the labeling device 2 used in conjunction with an accessory 30 of an article 32. The accessory 30 as shown is a basket hanger and the labeling device is affixed to the accessory 30 by curving the labeling device about the holder 36, locating the upper region of the header 14 of the labeling device 2 through the elongated opening 38 (see FIG. 7) formed in the perforated channel 18.

The following examples are provided to illustrate the invention, but are not intended to limit the scope thereof. All parts and percentages are by weight unless otherwise indicated.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner. As can be seen, the teaching of amounts expressed as "parts by weight" herein also contemplates the same ranges expressed in terms of percent by weight. Thus, an expression in the Detailed Description of the Invention of a range in terms of at "'x' parts by weight of the resulting polymeric blend composition" also contemplates a teaching of ranges of same recited amount of "x" in percent by weight of the resulting polymeric blend composition."

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps. By use of the term "may" herein, it is intended that any described attributes that "may" be included are optional.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

What is claimed is:

1. A labeling device comprising a body having:
(a) display portion;
(b) a header portion located adjacent the display portion, the header portion including:
(i) an upper region having:
(1) at least one aperture,
(2) a T-shaped slit having a first linear slit perpendicular to and abutting a second linear slit, wherein the T-shaped slit is spaced apart from the at least one aperture and the second linear slit is located between the first linear slit and the at least one aperture;
(ii) a lower region adjacent both the upper region and the display portion, the lower region having:
(1) perforated channel extending longitudinally an entire length between the upper region and the display portion and extending between a bottom edge of the T-shaped slit and a juncture of the lower region with the display portion;
wherein the perforated channel is able to be separated to form an elongated opening in the lower region;
wherein the first linear slit is parallel with and adjacent to the perforated channel so that the bottom edge of the T-shaped slit is in communication with the perforated channel;
wherein the lower region has a width that is narrower than an entire width of the upper region and an entire width of the display portion; and
wherein the labeling device is able to form a loop by inserting the display portion or the header portion through the elongated opening.

2. The labeling device of claim 1, wherein the labeling device is held in place on an article by the T-shaped slit without separating the perforated channel; and
wherein at least a portion of the article extends into and through the T-shaped slit.

3. The labeling device of claim 1, wherein the perforated channel extends into the display portion.

4. The labeling device of claim 1, wherein the display portion has a width that is equal to a width of the header portion.

5. The labeling device of claim 1, wherein the at least one aperture comprises one or more detachment features located about a perimeter of the at least one aperture,
and wherein a center piece of the at least one aperture is removable.

6. The labeling device of claim 1, wherein the lower region has a length that is longer than any length of the upper region.

7. The labeling device of claim 1, wherein the at least one aperture has a substantially circular shape, and
wherein the at least one aperture engages at least one portion of an elongated member of an article to be labeled so that the at least one portion extends into and through the aperture.

8. The labeling device of claim 1, wherein the labeling device includes a coating, a printing, stickers, or a combination thereof.

9. The labeling device of claim 1, wherein the body of the labeling device is integrally formed from one piece of material.

10. The labeling device of claim 9, wherein the body of the labeling device is die-cut from a material selected from the group consisting of paperboard, cardboard, fiberboard, natural fibers, mineral fibers, or any combination thereof.

11. A method of labeling comprising:
(a) providing the labeling device of claim 1;
(b) customizing the labeling device with a message, photo, instructions, information, usage ideas, plant care instructions, product information, or any combination thereof;
(c) separating a side of the perforated channel from an opposing side of the perforated channel to form the elongated opening;
(d) curving the labeling device about an article;
(e) locating the upper region through the elongated opening formed in the perforated channel, thereby forming the loop about the article; and
wherein the article is a pot, a basket, a planter, a bucket, or any combination thereof.

12. A method of labeling comprising:
a) providing the labeling device of claim 1;
b) locating the labeling device onto an elongated member of an article to be labeled so that at least a portion of the elongated member extends into and through the aperture; and
wherein the article is a pot, a basket, a planter, a bucket, or any combination thereof.

13. A method of labeling comprising:
a) providing the labeling device of claim 1;
b) locating the labeling device onto an elongated member of an article so that at least a portion of the elongated member extends into and through the T-shaped slit, and wherein the T-shaped slit is in communication with the perforated channel; and
wherein the article is a pot, a basket, a planter, a bucket, or any combination thereof.

14. The labeling device of claim 1, wherein the labeling device is reusable and can be attached to an article having an elongated member by all of the following manners:
(a) a portion of the elongated member extends into and through the T-shaped slit,
(b) a portion of the elongated member extends into and through the at least one aperture, (c) the display portion curves around the article and is inserted through the perforated channel.

15. The labeling device of claim 1, wherein the labeling device can be attached to an article having an elongated member by all of the following manners:
   (a) a portion of the elongated member extends into and through the T-shaped slit,
   (b) a portion of the elongated member extends into and through the at least one aperture,
   (c) the display portion curves around the article and is inserted through the perforated channel; and
wherein the article is a pot, a basket, a planter, a bucket, or any combination thereof.

16. The labeling device of claim 1, wherein the first linear slit is adjacent to the perforated channel at the juncture between the upper region and the lower region.

17. A labeling device comprising a body having:
   (a) a display portion;
   (b) a header portion located adjacent the display portion, the header portion including:
      (i) an upper region having:
         (1) an aperture; and
         (2) a T-shaped slit having a first linear slit perpendicular to and abutting a second linear slit, the T-shaped slit is spaced apart from the aperture, and the second linear slit is located between the first linear slit and the aperture;
      (ii) a lower region adjacent both the upper region and the display portion, the lower region having,
         (1) a perforated channel extending longitudinally an entire length between a bottom edge of the first linear slit of the T-shaped slit and a juncture of the lower region with the display portion,
         wherein the first linear slit is parallel with the perforated channel;
         wherein the bottom edge of the first linear slit of the T-shaped slit is located at the juncture of the upper region with the lower region, and the bottom edge abuts with an end of the perforated channel; and
         wherein the lower region has a width that is narrower than an entire width of the upper region.

18. The labeling device of claim 17, wherein the perforated channel extends into the display portion.

19. A method of labeling comprising:
   providing a labeling device, the labeling device comprising a body having:
      (a) display portion; and
      (b) a header portion located adjacent the display portion, the header portion including:
         (i) an upper region having an aperture and a T-shaped slit spaced apart from the aperture, wherein the T-shaped slit has a first linear slit perpendicular to and abutting a second linear slit, and the second linear slit is located between the first linear slit and the aperture;
         (ii) a lower region adjacent both the upper region and the display portion, wherein the lower region has a width narrower than an entire width of the upper region;
         (iii) a perforated channel along the lower region which extends longitudinally an entire length between the upper region and the display portion, is parallel with the first linear slit, and is adjacent to an end of the first linear slit which opposes the second linear slit;
   wherein a user can affix the labeling device to an article by all of the following methods consisting of:
      (A) a method for forming a loop from the labeling device, the method comprising:
         (1) separating a side of the perforated channel from an opposing side of the perforated channel to form an elongated opening;
         (2) curving the labeling device about an article;
         (3) locating the upper region through the elongated opening formed in the perforated channel, thereby forming a loop about the article;
      (B) a method for hanging the labeling device, the method comprising:
         locating the labeling device onto an elongated member of the article to be labeled so that at least a portion of the elongated member extends into and through the aperture; and
      (C) a method for hanging the labeling device, the method comprising:
         locating the labeling device onto an elongated member of the article to be labeled so that at least a portion of the elongated member extends into and through the T-shaped slit.

20. The method of claim 19, wherein the end of the first linear slit is located at a juncture between the upper region and the lower region.

* * * * *